UNITED STATES PATENT OFFICE.

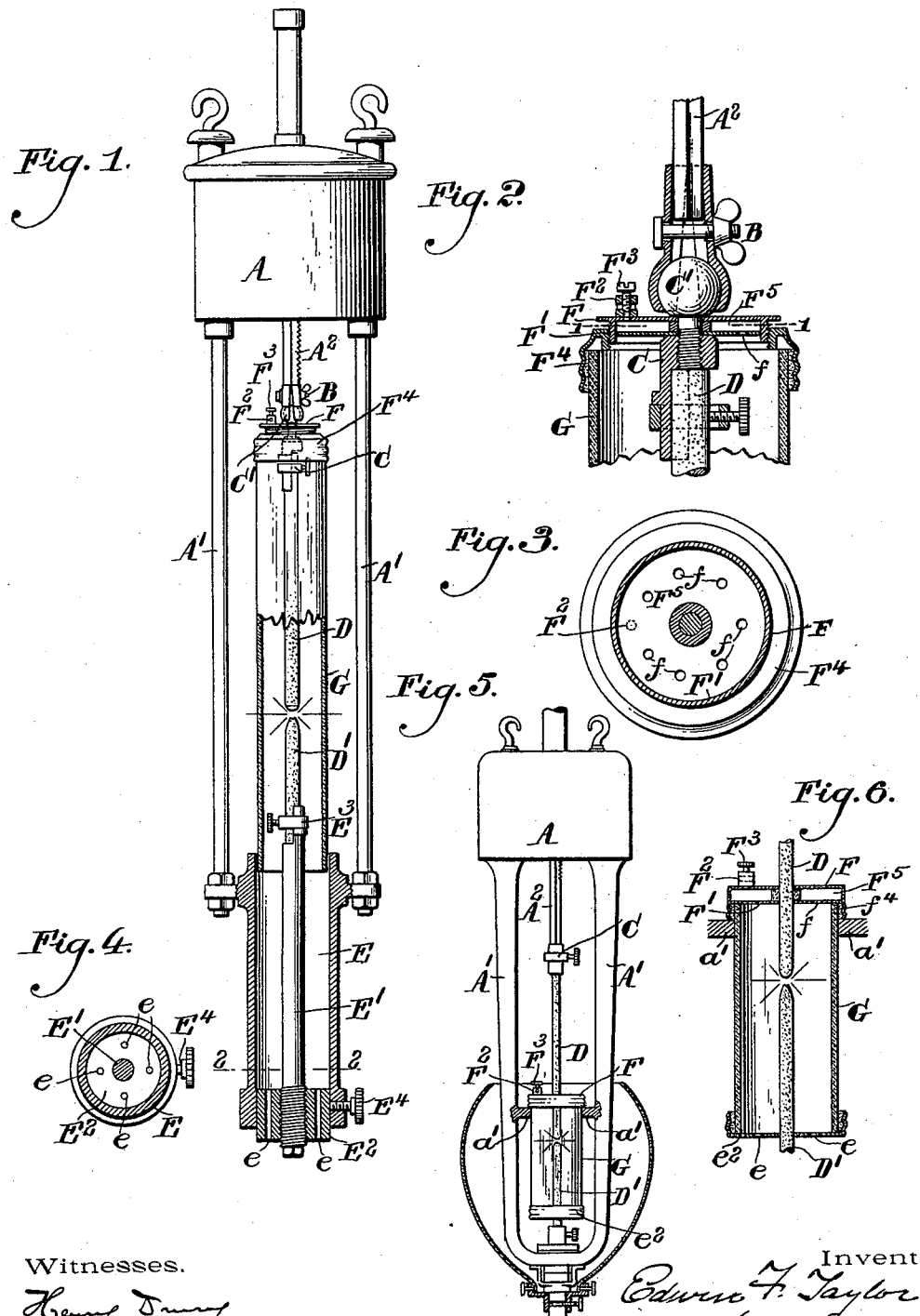

EDWIN F. TAYLOR, OF WEST CHESTER, PENNSYLVANIA.

ELECTRIC-ARC LAMP.

SPECIFICATION forming part of Letters Patent No. 587,465, dated August 3, 1897.

Application filed March 18, 1896. Serial No. 583,666. (No model.)

*To all whom it may concern:*

Be it known that I, EDWIN F. TAYLOR, a citizen of the United States, residing at West Chester, in the county of Chester, in the State of Pennsylvania, have invented a certain new and useful Improvement in Electric-Arc Lamps, of which the following is a true and exact description, reference being had to the accompanying drawings, which form a part of the specification.

My invention relates to electric-arc lamps, and has for its object to provide means whereby the life of the carbon electrodes may be materially prolonged, whereby also an arc of greater length is made practicable in a given limit and whereby also the lamp is made less dangerous as a possible cause of fire.

It is well known that the durability of carbons used in electric-arc lamps is greatly lessened, owing to the fact that they are, as a rule, used in free exposure to atmospheric currents, whereby there is not only an oxidation or burning of the carbons, but also a considerable loss of the substance of the carbons, owing to their chipping or disintregating, this being due to the action of the cold air coming in contact with the intensely-heated carbon. Attempts have been made to overcome these difficulties by partially or wholly excluding air from the carbons, but where it has been attempted to exclude the air entirely great difficulties have been met with, and among these difficulties notably the tendency of the intense heat generated by the arc to melt or otherwise destroy the inclosing medium. Where, on the other hand, the air has been but partly excluded, there has been a tendency to form in the inclosing globe or chimney carbon-monoxid gas, which, owing to the admission of air even in small quantities, will either form an explosive mixture or will be ignited, in the latter case generating such additional heat in immediate contact with the envelop as to cause its destruction. Now my invention is based on my discovery that the life of the carbons can be materially prolonged by inclosing them in a chimney or envelop, through which a constant but exceedingly slow draft is permitted to take place from the bottom upward. By this means I am enabled to spring the arc in what is substantially a non-oxidizing atmosphere, while at the same time the heated gases are permitted to gradually escape and cooler gases to gradually enter. The influx of the air is sufficient to keep the temperature of the chimney below the point where it is likely to be destructive, and at the same time it is sufficiently heated before coming in contact with the heated ends of the carbons not to have any tendency to cause chipping or disintegration. The amount of air permitted to circulate through the chimney should vary with the number of amperes passed through the lamp, and I will mention that I have found that a circulation at the rate of one cubic foot per hour gave excellent results where three amperes were passing through the carbons, while where from ten to twelve amperes were passed through the carbons I found it necessary to increase the ventilation to from four to six cubic feet per hour.

The nature of my improvements will be best understood as described in connection with the drawings in which they are illustrated, and in which—

Figure 1 is a side elevation, partly in section, of a lamp provided with my improvements in the form in which I prefer to embody them, Fig. 2 being an enlarged sectional view taken through the top of the chimney; Fig. 3, a cross-sectional view taken on the line 1 1 of Fig. 2; Fig. 4, a cross-sectional view taken on the line 2 2 of Fig. 1; Fig. 5, an elevation of a lamp provided with a modified form of my improvement, and Fig. 6 a central longitudinal section through the chimney shown in Fig. 5.

A indicates the body of the lamp, which may be of any convenient construction for high or low tension and either alternating or direct current.

A' A' indicate the depending parts of the frame, to which the lower carbon is secured, and $A^2$ the feed rod or bar of the lamp, to which the upper carbon is attached.

B, Figs. 1 and 2, indicates a gripping device by which a clamp holding the carbon is secured to the end of the rod $A^2$. This may be replaced by any device for connecting the carbon-clutch (indicated at C) and the rod $A^2$.

D indicates the upper carbon, and D' the lower carbon.

E, Figs. 1 and 4, is a cylindrical casing secured on the end of the rods A' and in which is secured a rod or standard E', to which in turn the lower carbon D' is attached, as by means of a clutch $E^3$. As shown, the standard E' screws into a circular block E², which fits in the bottom of the casing E and is held in place by a set-screw E⁴, $e\ e$ indicating perforations in the block E², which preferably should be symmetrically disposed around its center.

G is a chimney, which is to be made of transparent material and which I have used both made of glass and of mica. This chimney is provided with contracted openings both at top and bottom, and, as shown, the top of the chimney is covered by a plate F', having in it a series of symmetrically-disposed perforations $f$, which open into a chamber F⁵, formed by a plate F, and from which leads an escape-opening F². This opening should be arranged so that it will not come opposite to any of the perforations $f$ and is preferably provided with a regulating-valve F³, by which the amount of air permitted to circulate through the chimney can be nicely regulated.

As shown in Figs. 1, 2, and 3, the plates F and F' are secured together and screw into an annular rim F⁴, which in turn is tightly secured to the top of the chimney, and, as shown in Figs. 5 and 6, the annular frame F⁴ is replaced by a depending flange $f^4$, formed integral with the plate F. Of course, however, the plan adopted for securing the closing-plates to the top of the chimney is immaterial.

In the plan indicated in Figs. 1, 2, and 3 the chimney, by means of its plates F and F', is secured to the feed-bar A² and moves down with the upper carbon, also attached to this rod, the lower end of the chimney fitting into the cylindrical casing E and the admission of air to the bottom of the chamber being provided for both in the slight annular orifice between the chimney and the cylindrical casing and also by the perforations $e$ in the circular block E², and it will be noticed that this construction provides not only for the free downward movement of the chimney as the carbons become shorter, but also for the collection and retention of any fragments of carbon in the casing E and out of contact with the chimney. In the plan, however, which is indicated in Figs. 5 and 6 I have shown a plate E² secured to the bottom of the chimney and provided with perforations $e$ for the entrance of air and with a central perforation through which the lower carbon D' extends, while the upper carbon extends through a central perforation in the plates F and F'. Extensions $a'\ a'$ from the rods A' support the chimney in place, the upper carbon feeding down through the top plates as it is consumed and the chimney being readily removed when the upper carbon is drawn up above it. A chimney constructed in this way could be permitted to rest directly upon the clamp which secures the lower carbon in place, as it is effectually centered and steadied by the engagement with the two carbons.

In use the proper amount of draft is conveniently regulated by the valve F³, the orifice at the bottom being so small that practically no air will enter the chimney. Except when the gases are permitted to escape from the top it is highly desirable that the ventilating perforations $e$ and $f$ should be symmetrically disposed, so that the draft, if so gradual a movement is entitled to be called a "draft," may be regular and certain throughout the chimney, and it is for this purpose itself that I place the escape-orifice F² out of direct line with any of the perforations $f$, in this way preventing a direct straight draft through any of the perforations to the escape.

Having now described my invention, what I claim as new, and desire to secure by Letters Patent, is—

1. A chimney for electric-arc lamps having in combination a plate as F' adapted to close its top said plate having orifices as $f$ symmetrically disposed about its center, a chamber F⁵ into which said orifices open, an escape-passage F² leading from said chamber to the air, and means for closing the bottom of the chimney adapted to have only a contracted opening thereto.

2. A chimney for electric-arc lamps having in combination a plate as F' adapted to close its top said plate having orifices as $f$ symmetrically disposed about its center, a chamber F⁵ into which said orifices open, an escape-passage as F² leading from said chamber to the air, a valve for regulating said passage, and means for closing the bottom of the chimney adapted to have only a contracted opening thereto.

3. A chamber for electric-arc lamps having in combination a plate as F' adapted to close its top said plate having orifices as $f$ symmetrically disposed about its center, a chamber F⁵ into which said orifices open, an escape-passage as F² leading from said chamber to the air and so disposed as not to come opposite to any of orifices $f$, a valve for regulating said passage, and means for closing the bottom of the chimney adapted to have only a contracted opening thereto.

4. A chimney for electric-arc lamps having in combination a plate as F' adapted to close its top, said plate having orifices as $f$ symmetrically disposed about its center, a chamber F⁵ into which said orifices open, an escape-passage as F² leading from said chamber to the air, and means for closing the bottom of the chimney having restricted symmetrically-disposed openings for admitting air.

5. In combination with an electric-arc lamp, a cylindrical casing E secured to the base of the lamp-frame, a chimney fitting in said casing E and secured to the feed-rod of the upper carbon and a restricted opening in the top of said chimney.

EDWIN F. TAYLOR.

Witnesses:
J. E. CARPENTER,
FRANCIS T. CHAMBERS.